United States Patent
Kalambur et al.

(10) Patent No.: US 6,954,865 B2
(45) Date of Patent: Oct. 11, 2005

(54) REDUCED VERIFICATION COMPLEXITY AND POWER SAVING FEATURES IN A PIPELINED INTEGRATED CIRCUIT

(75) Inventors: Atul Kalambur, Sunnyvale, CA (US); Michelle Wong, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 533 days.

(21) Appl. No.: 10/174,451

(22) Filed: Jun. 18, 2002

(65) Prior Publication Data

US 2003/0233593 A1 Dec. 18, 2003

(51) Int. Cl.[7] ................................................. G06F 1/32
(52) U.S. Cl. ....................... 713/320; 713/340; 712/208; 712/214
(58) Field of Search ................................ 713/300, 320, 713/321, 322, 340; 712/208, 214

(56) References Cited

U.S. PATENT DOCUMENTS

| | | | |
|---|---|---|---|
| 4,785,393 A | * 11/1988 | Chu et al. | 712/221 |
| 5,944,841 A | 8/1999 | Christie | 714/38 |
| 6,000,035 A | 12/1999 | Matsushima et al. | 713/320 |
| 6,219,796 B1 | * 4/2001 | Bartley | 713/320 |
| 6,647,488 B1 | * 11/2003 | Takeno et al. | 712/212 |
| 2002/0002664 A1 | 1/2002 | Kuemerle | 712/39 |

OTHER PUBLICATIONS

International Search Report for PCT/US 03/18876 (3 pages); and Notification of Transmittal of International Search Report (mailing date Jun. 24, 2004 ) (1 page).

* cited by examiner

*Primary Examiner*—Rehana Perveen
(74) *Attorney, Agent, or Firm*—Osha Liang LLP

(57) ABSTRACT

An integrated circuit that uses a functional unit that outputs one set of values when in a power saving mode is provided. The functional unit, generally pipelined, is capable of being in the power saving mode dependent on an instruction decode/issue unit, and when in the power saving mode, the functional unit, using power saving mode circuitry, outputs one set of values as seen by components external to the functional unit regardless of the state the functional unit is in when the functional unit is initially put in the power saving mode.

10 Claims, 5 Drawing Sheets

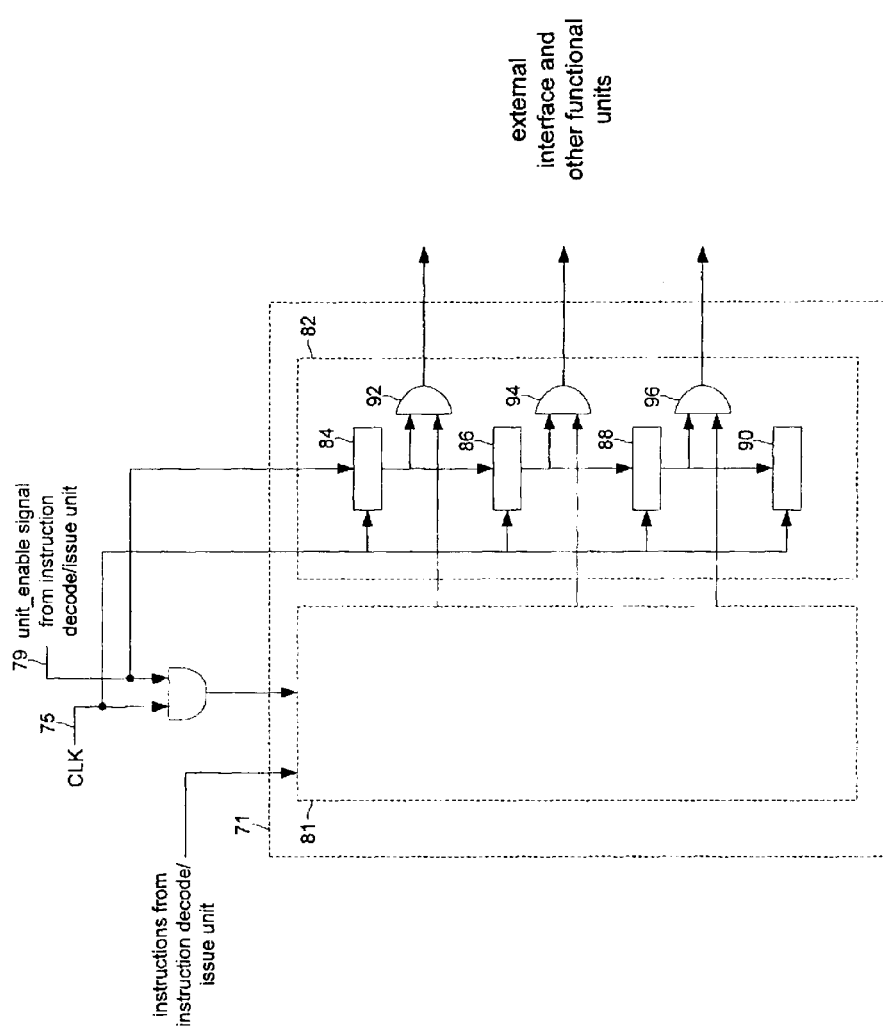

REDUCED VERIFICATION COMPLEXITY AND POWER SAVING FEATURES IN A PIPELINED INTEGRATED CIRCUIT

BACKGROUND OF INVENTION

A typical computer system includes at least a microprocessor and some form of memory. The microprocessor has, among other components, arithmetic, logic, and control circuitry that interpret and execute instructions necessary for the operation and use of the computer system. FIG. 1 shows a typical computer system 10 having a microprocessor 12, memory 14, integrated circuits 16 that have various functionalities, and communication paths 18, i.e., buses and signals, that are necessary for the transfer of data among the aforementioned components of the computer system 10.

Microprocessors, and other types of integrated circuits, have a large number of functional units to enable them to execute multiple instructions in parallel. Although such microprocessors are capable of executing many instructions in a given clock cycle, the average number of instructions executed per clock cycle is typically slightly above 1. One reason for this stems from the chains of dependencies between instructions, i.e., where a given instruction is dependent on one or more older instructions. In other words, because execution of one instruction, in many cases, depends on execution of one or more other instructions, peak parallelism, and hence, peak performance, is difficult to attain on a constant basis.

One of the undesired effects of such parallelism inefficiency is high, and wasted, power consumption. Because a functional unit continues to operate, i.e., get clocked, irrespective of whether all or a portion of the functional unit is being used, power is wasted. In response, designers, in order to reduce average power consumption, have devised techniques to enable a microprocessor to determine which functional units are not being used and disable the clocks to them. By disabling the clock to a functional unit, state devices, which are major sources of power consumption, cannot switch state, and therefore, cannot partake in unnecessary and wasted power consumption.

FIG. 2 shows a typical implementation of an instruction decode/issue unit 20 and a plurality of functional units 1 . . . n 22, 24, and 26. The instruction decode/issue unit 20 processes an incoming stream of instructions 27 and selectively dispatches them to functional units 1 . . . n 22, 24, and 26 via instruction signals 42, 44, and 46, respectively. AND gates 30, 32, and 34 each input a clock signal, CLK 28, and a unit enable signal (unit_enable_1 36 for functional unit 22, unit_enable_2 38 for functional unit 24, and unit_enable_n 40 for functional unit n). If the unit enable signal, under control of the instruction decode/issue unit 20, is 'low,' the corresponding AND gate outputs 'low' to the respective functional unit. Alternatively, when the instruction decode/issue unit 20 outputs 'high' on a particular unit enable signal, then the corresponding AND gate outputs the clock signal 28 to the respective functional unit. Thus, when the unit enable signal to a particular functional unit is 'high,' that functional unit remains 'on' because the clock signal 28 is allowed to clock the components of that functional unit. In other words, when the unit enable signal to a functional unit is 'high,' the clock signal 28 to that functional unit is allowed to clock state devices in the functional unit so that such state devices can switch, i.e., update their state.

The unit enable signals from the instruction decode/issue unit 20 to the functional units 1 . . . n 22, 24, and 26 facilitate power saving when one or more functional units do not need to be clocked during one or more clock cycles. For example, if upon decoding, the instruction decode/issue unit 20 determines that a particular functional unit will not be needed in the current or a future clock cycle, the instruction decode/issue unit 20 may disable that functional unit, via the corresponding unit enable signal, at the appropriate time in order to save power.

However, although power may be saved using such an implementation as shown in FIG. 2, freezing the state of certain functional unit while allowing other functional units to be clocked has the undesirable side effect of introducing bugs, i.e., operational state inconsistencies. By holding state in some functional units and updating state in other functional units, the total number of possible states in an integrated circuit design may increase exponentially. Hence, the likelihood of bugs increases the complexity of verification and resources needed to find and fix such bugs. In fact, bugs which take a large amount of time (in terms of clock cycles) to manifest themselves can often be virtually impossible to find before actual fabrication of the integrated circuit. Moreover, even in a post-fabrication stage, verification, in many cases, is prohibitively expensive from both a monetary and time perspective.

SUMMARY OF INVENTION

According to one aspect of the present invention, an integrated circuit comprises an instruction decode/issue unit that processes a plurality of instructions and a functional unit that inputs and executes the plurality of instructions, where the functional unit comprises: a first portion that is in a power saving mode dependent on a signal generated from the instruction decode/issue unit, where the first portion can be in any one of a plurality of states when in the power saving mode; and a second portion that outputs a particular value when in the power saving mode, where the particular value is independent of any one of the plurality of states.

According to another aspect, a method for performing integrated circuit operations comprises decoding and issuing a plurality of instructions using an instruction decode/issue unit; generating a signal to a functional unit dependent on the decoding and issuing; inputting and executing the plurality of instructions using a first portion of the functional unit; and outputting a particular value from a second portion of the functional unit when the functional unit is in a power saving mode, where the functional unit is in the power saving mode dependent on the signal, and where the particular value is independent of any one of a number of states the first portion can be in when the functional unit is in the power saving mode.

According to another aspect, an integrated circuit comprises instruction processing means for decoding and issuing a plurality of instructions and instruction execution means for inputting and executing the plurality of instructions, where the instruction means comprises: means for being in any one of a plurality of states when in a power saving mode, and means for outputting a particular value when in the power saving mode, where the particular value is independent of any one of the plurality of states.

Other aspects and advantages of the invention will be apparent from the following description and the appended claims.

BRIEF DESCRIPTION OF DRAWINGS

FIG. 5 shows a functional unit in accordance with an embodiment of the present invention.

DETAILED DESCRIPTION

Figure 1:
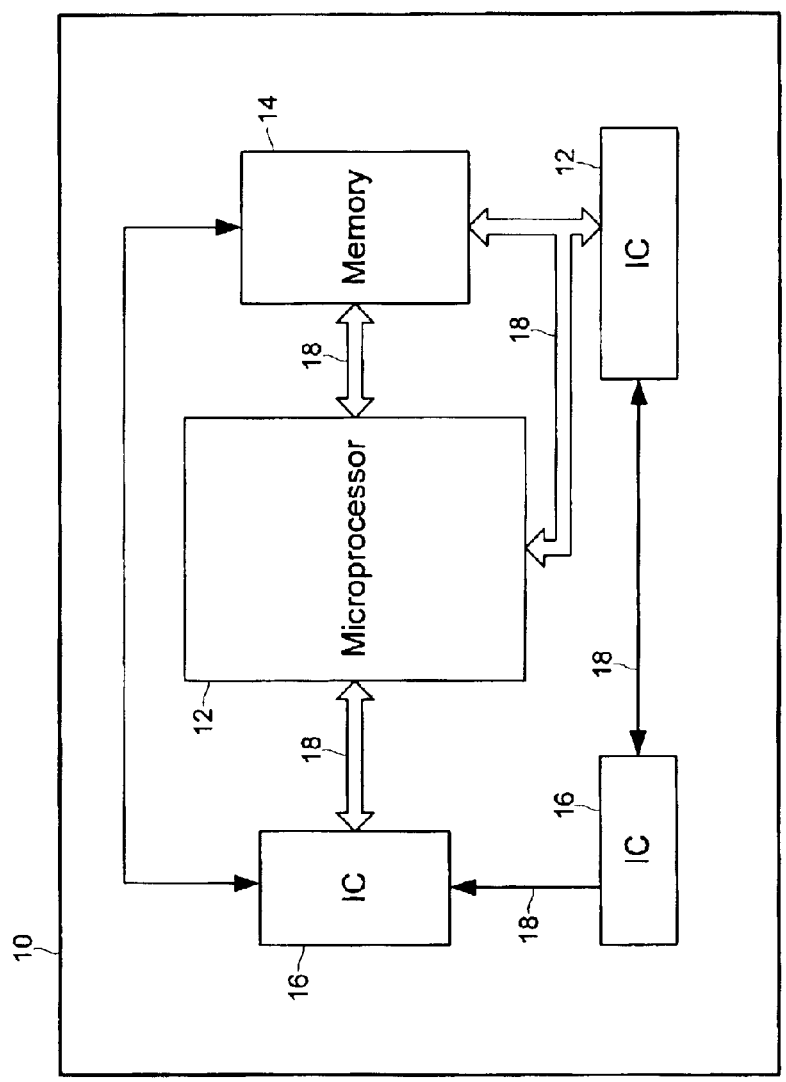
FIG. 1 shows a typical computer system.
Figure 2:
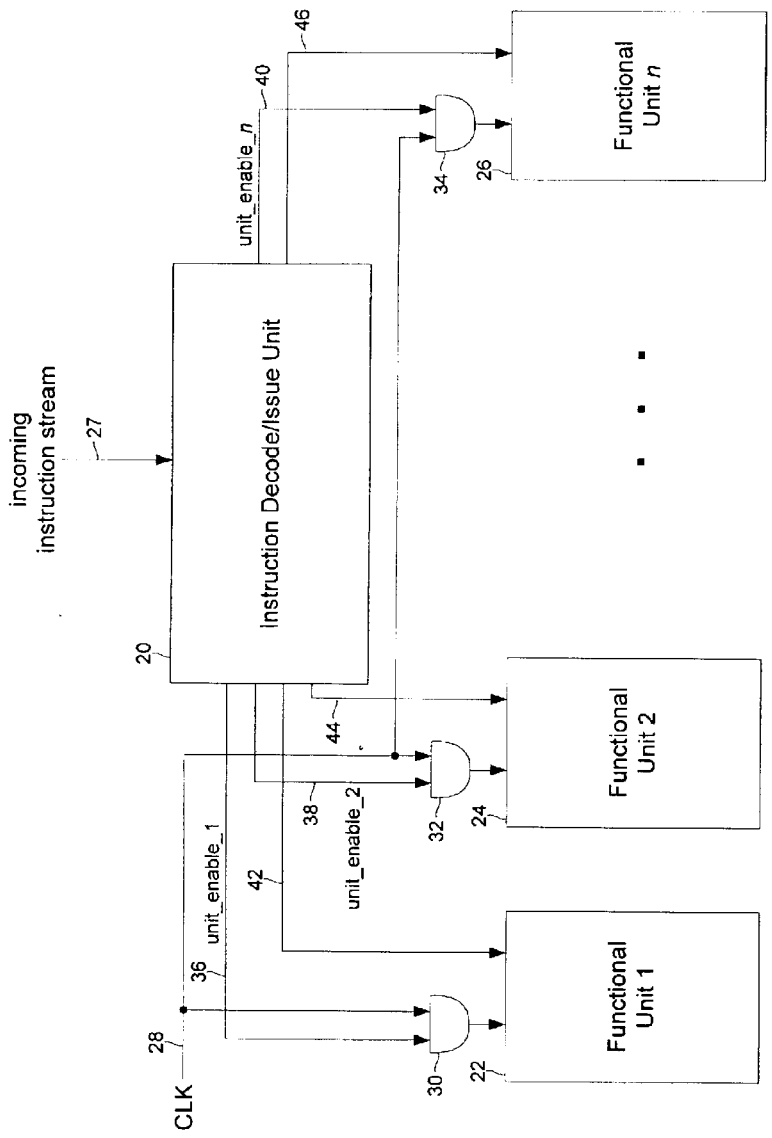
FIG. 2 shows a typical implementation of an instruction decode/issue unit and a plurality of functional units.
Figure 3:
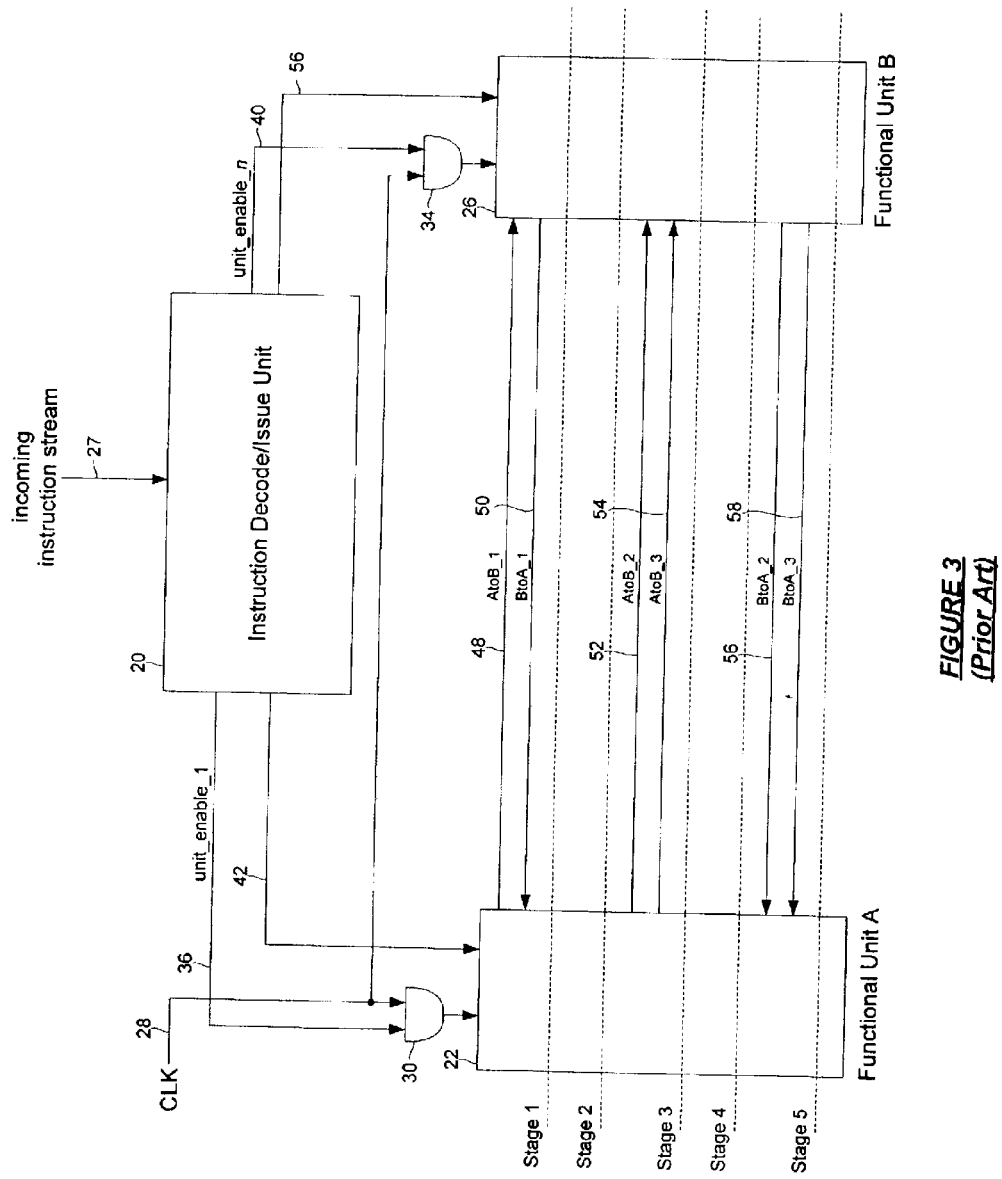
FIG. 3 shows a typical implementation of an instruction decode/issue unit and a plurality of functional units.

The problem of undesired bugs being introduced due to the freezing of state in some functional units while allowing the updating of state in other functional units is further shown in FIG. 3. Similar to FIG. 2, FIG. 3 shows a typical implementation of an instruction decode/issue unit 20, a first functional unit, functional unit A 22, and a second functional unit, functional unit B 26. As is shown in FIG. 3, the functional units 22 and 26 are pipelined, and are thus shown as being divided into a number of stages. Because the functional units 22 and 26 are pipelined, they may each accept a new instruction every clock cycle.

Signals 48, 50, 52, 54, 56, and 58 are the interface signals between the first and second functional units 22 and 26. Those skilled in the art will note that in complex high-performance architectures, the number of interface signals may be high and there may be complex interactions between functional units in order to achieve desired functionality.

When the unit enable signals 36 and 40 to the respective functional units 22 and 26 are 'high,' i.e., no power saving mode is desired among the first and second functional units 22 and 26, the functional units 22 and 26 are clocked by the clock signal 28. Therefore, for example, if functional unit A 22 is being used and functional unit B 26 is idle, because the state devices within functional unit B 26 are allowed to capture new inputs from the instruction decode/issue unit 20, the interface signals from functional unit B 26 to functional unit A 22 will move to their quiescent values indicating that no active instruction is present in functional unit B 26.

When the clock signal 28 to a particular functional unit is disabled by setting the corresponding unit enable signal 'low,' the state of that functional unit is frozen, thereby saving switching power. However, this also causes the effect that the interface signals from that functional unit are also frozen. Those skilled in the art will note that this effect also typically applies to valid signals as well because they would also have to be derived off the current state of the functional unit. Such an effect, as mentioned above, has the potential to introduce bugs in the design of an integrated circuit that are very difficult to debug and repair.

For example, consider the situation when functional unit A 22 is 'on' and functional unit B 26 is 'off.' The interface signals from functional unit B 26 to functional unit A 22 will have values corresponding to the last time functional unit B 26 was 'on.' This may be hundreds, thousands, or millions of clock cycles earlier. A particular instruction could now be issued to functional unit A 22 that could cause it to move to a state that is incompatible with the set of values on the interface signals from functional unit B 26 to functional unit A 22. To track down the original source of this bug may turn out to be very difficult because functional unit B 26 could have frozen in any of a very large number of possible states. To guard against this problem, functional unit A 22 would have to be designed so as to be robust enough to accommodate all of functional unit B's 26 possible states.

Figure 4:
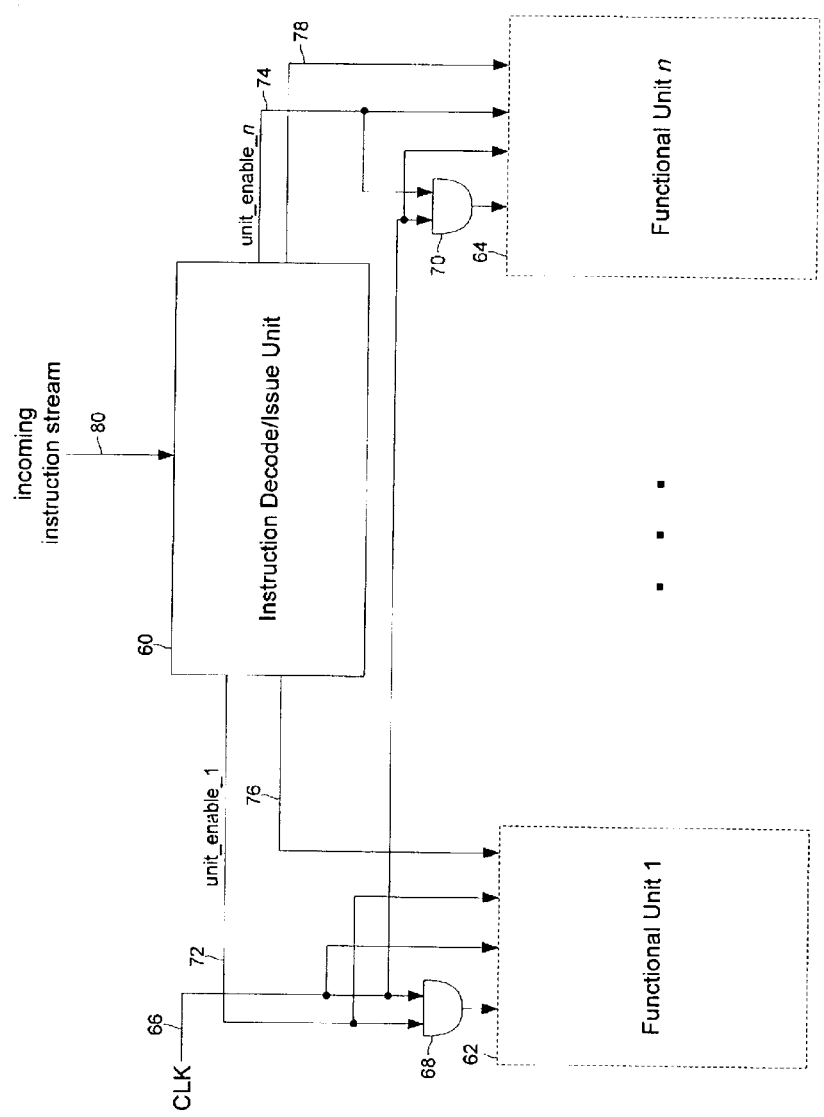
FIG. 4 shows an implementation of an instruction decode/issue unit and a functional unit in accordance with an embodiment of the present invention.

To this end, the present invention relates to a design that allows an integrated circuit to both implement power saving features and avoid increased verification complexity associated with functional unit state freezing. FIG. 4 shows an exemplary implementation of an instruction decode/issue unit 60, a first functional unit 62, and an nth functional unit 64. The instruction decode/issue unit 60 processes an incoming stream of instructions 80 and selectively issues them to the functional units 62 and 64. AND gates 68 and 70 each input a clock signal, CLK 66, and a unit enable signal (unit_enable_1 72 for functional unit 1 62 and unit_enable_n 74 for functional unit n 64). When a unit enable signal to a particular functional unit is 'low,' the corresponding AND gate outputs a constant 'low' to the respective functional unit, thus putting the functional unit in a power saving mode. Alternatively, if the unit enable signal to the functional unit is 'high,' the corresponding AND gate outputs the clock signal 66, thus allowing the functional unit to operate in a normal mode.

In addition to the signal from the output of the AND gate and respective instruction signals 76 and 78 from the instruction decode/issue unit 60 to the first and second functional units 62 and 64, each functional unit inputs the clock signal 66 and its respective unit signal as they are before being inputted into the respective AND gates. In other words, each functional unit inputs an unqualified clock signal 66 that always runs independent of whether the functional unit is in a power saving mode.

FIG. 5 shows an exemplary functional unit 71 in accordance with an embodiment of the present invention. The functional unit 71 is representative of the functional units 62 and 64 shown in FIG. 4. In FIG. 5, the functional unit 71 may be viewed as having a first portion 81 and a second portion 82. The first portion 81 has a configuration and operation similar to that of the functional units 22, 24, and 26 shown in FIG. 2. The second portion 82, in addition to being capable of maintaining the power saving benefit incurred when the functional unit 71 is in a power saving mode, helps mitigate the problem of bugs by converting a large number of 'off' state outputs from the first portion 81 into a single 'off' state output from the functional unit 71 as seen by components external to the functional unit 71.

The unit enable signal 79 from the instruction decode/issue unit (not shown in FIG. 5) is staged through the functional unit 71 by a set of state devices 84, 86, 88, and 90 that are continuously clocked by the clock signal 75 regardless of the state of the unit enable signal 79. The unit enable signal 79 is respectively ANDed 92, 94, and 96 to each output from stages of the first portion 81. This ensures that if the unit enable signal 79 is set 'low' by the instruction decode/issue unit (not shown), the value of interface signals from the functional unit 71 seen by other functional units (not shown) is zero. Accordingly, these other functional units only need to be designed to recognize and accommodate this one possible state when the functional unit 71 is in a power saving mode.

Advantages of the present invention may include one or more of the following. In some embodiments, even though a functional unit may be frozen in any one of a very large number of possible states, all these possible states are reduced to one with respect to that seen by interfaces and other functional unit external to the functional unit.

In some embodiments, from a verification perspective, the amount of debugging/repair effort/resources is reduced from involving a very large number of possible states to only one OFF state for a particular functional unit.

In some embodiments, addition of circuitry needed to allow a functional unit to output only one set of values during a power saving mode is minimal and is offset by the reduction of circuitry needed in other functional because they need to only take into account one OFF state from functional units in a power saving mode.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An integrated circuit, comprising:
   an instruction decode/issue unit that processes a plurality of instructions; and
   a functional unit that inputs and executes the plurality of instructions, wherein the functional unit comprises:
      a first portion that is in a power saving mode dependent on a signal generated from the instruction decode/issue unit, wherein the first portion can be in any one of a plurality of states when in the power saving mode, and
      a second portion that outputs a particular value when in the power saving mode, wherein the particular value is independent of any one of the plurality of states.

2. The integrated circuit of claim 1, wherein the functional unit is pipelined.

3. The integrated circuit of claim 1, wherein the first portion is dependent on the signal and the clock signal when the functional unit is in a normal mode.

4. The integrated circuit of claim 1, wherein the second portion comprises a state device that inputs the signal and is clocked by the clock signal, wherein the state device is operatively connected to a stage of the first portion.

5. The integrated circuit of claim 4, further comprising circuitry operatively connected to the state device, wherein the circuitry outputs a particular value when the signal is at a first value, and wherein the circuitry outputs a value corresponding to the stage when the signal is at a second value.

6. A method for performing integrated circuit operations, comprising:
   decoding and issuing a plurality of instructions using an instruction decode/issue unit;
   generating a signal to a functional unit dependent on the decoding and issuing;
   inputting and executing the plurality of instructions using a first portion of the functional unit; and
   outputting a particular value from a second portion of the functional unit when the functional unit is in a power saving mode, wherein the functional unit is in the power saving mode dependent on the signal, and wherein the particular value is independent of any one of a number of states the first portion can be in when the functional unit is in the power saving mode.

7. The method of claim 6, wherein the functional unit is pipelined.

8. The method of claim 6, further comprising:
   when in a normal mode, using a clock signal and the signal to update state of the first portion and output a set of values corresponding to a state of the first portion.

9. The method of claim 8, further comprising:
   when in the power saving mode, outputting a particular value from a state device in the second portion dependent on the signal being at a first value; and
   when in the normal mode, outputting a value corresponding to a particular stage of the first portion.

10. An integrated circuit, comprising:
    instruction processing means for decoding and issuing a plurality of instructions; and
    instruction execution means for inputting and executing the plurality of instructions, wherein the instruction means comprises:
       means for being in any one of a plurality of states when in a power saving mode, and
       means for outputting a particular value when in the power saving mode, wherein the particular value is independent of any one of the plurality of states.

* * * * *